Nov. 1, 1966     E. JENSEN ETAL     3,282,326
EVAPORATING METHOD AND APPARATUS THEREFOR
OF THE ROTATING DRUM TYPE Filed July 27, 1964     6 Sheets-Sheet 1

United States Patent Office 3,282,326
Patented Nov. 1, 1966

3,282,326
EVAPORATING METHOD AND APPARATUS THEREFOR OF THE ROTATING DRUM TYPE
Erik Jensen, Soborg, and Peter Harald Pedersen, Holte, Denmark, assignors to Novo Terapeutisk Laboratorium A/S., Copenhagen, Denmark
Filed July 27, 1964, Ser. No. 385,404
Claims priority, application Denmark, Mar. 17, 1964, 1,364/64
16 Claims. (Cl. 159—12)

The invention relates to a method by which liquid is evaporated from a solution being under vacuum and being applied to a heated, closed heat-transmission surface, a thin coat or film of liquid being formed thereon. The term "solution" as used in this and the following connections is to be understood as a solution of solids in one or more liquids as well as a mixture of two or more liquids.

Different methods of this kind are known, by which concentration of solutions is carried through. For instance, it is known to pass a solution through a vertical, tubular container with a rotor disposed coaxially therein and with a surrounding steam jacket. Operation of the rotor causes the solution to move downwardly as a thin coat or film along the inner side of the tubular container, impelled by centrifugal as well as gravitation forces. When a vacuum is produced in the interior of the container and steam is simultaneously passed through the steam jacket, part of the liquid of the solution will evaporate, whereas the unevaporated part of the solution, which is taken off at the bottom of the tubular container, will contain the less volatile constituents of the solution, i.e. it will be in the form of a concentrate, if the solution contains a solid or a sparingly evaporable substance.

This known method, however, has several drawbacks. In order to obtain a sufficiently thin and uniform coat or film of the solution along the inner surface of the tubular container it is necessary that the rotor blades are spaced 1 to 2 mm. or even less than that from the inner surface of the container, which imposes relatively small production tolerances for rotor and container. When, in order to achieve a high capacity by means of the known method, it is desired to use a large heat-transmission surface, it is necessary to select a container either with considerable height or with a comparatively large diameter. As there must be a free height above the vertical, tubular container to permit mounting and dismounting in connection with cleaning, maintenance, and repairs, there are normally rather narrow limits to the maximum height of the container. If the heat-transmission surface is increased by increasing the diameter of the container, the production of the latter will become so costly on account of the necessary small tolerances that the burden of interest and depreciation will set limits to the size of heat-transmission surface that can reasonably be used. If, by the known method of evaporation, a high capacity is to be obtained at a definite, comparatively high degree of concentration for the concentrate, it is consequently necessary to work with a relatively great difference between the temperature of the steam supplied to the steam jacket and the solution supplied to the tubular container. However, dissolved substances are frequently so heat-sensitive that it is impossible to work with an arbitrary, great difference in temperatures. Furthermore, the said great difference will be tantamount to a poor heat economy.

Another substantial drawback of the known method is that a precise regulation of the degree of concentration of the concentrate requires the use of a regulating mechanism of exceptional sensitivity. If, for example, an evaporation ratio of e.g. 1:10 is used by the said known method, increasing the heat supply to the solution by merely 5.5% will cause the evaporation ratio to be changed to abt. 1:20, so that there is incurred a risk of dehydrating the concentrate to such a degree that the solids burn on to the heat-transmission surface of the tubular container.

The invention has for its object to provide a method of the aforesaid kind, whereby a very great capacity can be obtained without substantially increasing the cost of the necessary heat-transmission surface, and also a good heat transmission and a precise regulation of the evaporation ratio, so that any solids contained in a solution do not burn on said surface.

The method according to the invention is characterized in that the solution is applied to the outer surface of a cylinder provided with longitudinal corrugations, said application being performed by spraying the solution on to the cylinder over a substantial part of the length thereof from a container disposed below the cylinder and being open upwardly toward same, while the cylinder is being rotated about a substantially horizontal axis, the solution being supplied to the container at a location which, as measured in the longitudinal direction of the cylinder, is spaced from the location, where the unevaporated part of the solution is removed from the container.

When in this way the solution is sprayed onto the rotating cylinder, a thin coat or film of liquid will adhere to the outer surface of the cylinder and rotate therewith. During such rotation, part of the liquid of the solution will evaporate. When the liquid film on the cylinder has been rotated once with the latter and has returned to the place of spraying, the unevaporated part of the solution will be washed off the cylinder by the new solution being sprayed thereon and will flow back to the container under the cylinder. As the solution in the container under the cylinder will move in the longitudinal direction of the cylinder, from the place where it is supplied and toward the point where it is discharged, the solution will acquire an ever increasing degree of concentration of the least volatile liquids and/or the solids during such movement. The manufacturing costs do not set a limit to the size of the heat-transmission surface, as, in contradistinction to the known method, there are no special requirements as to production tolerances. Thus, the cylinder can be given a desired, large diameter, and as it is mounted horizontally, it can be adapted to most factory premises without difficulty.

One effect of the longitudinal corrugations of the cylinder is to provide a relatively large active surface of the cylinder, and another that the greater part of the solution spray first hits the lateral faces of the corrugations and thus hits the surface of the cylinder at a fairly acute angle. This diminishes the liability of the solution to splashing, when it strikes against the cylinder surface. It is thereby obtained that the fluid particles, when sprayed onto the cylinder, only to a slight degree move longitudinally thereof at the moment of hitting its surface. Thus, the corrugations will reduce the risk of retrograde mixing of the solution. Furthermore, the diminished splashing will reduce the liability to foam formation.

The wall of the cylinder can be made relatively thin, and this in connection with the fact that on account of the powerful spraying of the cylinder no deposits will appear thereon will make it possible to obtain a comparatively high coefficient of heat transfer. As, furthermore, the method according to the inventtion makes it possible to work with a small difference in temperatures, on account of the practical possibility of employing a large heat-transmission surface, a very good heat economy can be achieved. The apparatus according to the invention offers the additional possibility of regulating the evaporation ratio in a very simple way. If, for instance, concentrate is discharged at a constant rate, and the supply of solution to the liquid container is regulated in such a way that the unevaporated quantity of liquid present in the container and on the cylinder is maintained substantially constant, which involves, by way of example, that the supply of solution must be increased, if the supply of heat to the cylinder and consequently the speed of evaporation are increased, the evaporation ratio will be rather insensitive to variations in the heat supply. The evaporation ratio could also be controlled by regulation of the rate of flow for the solution through the container, which is not possible in the known methods, where the rate of flow, as mentioned above, is determined by the gravity flow of the solution along the inner side of a tubular container.

The solution can be applied to the cylinder in several ways, e.g. by means of nozzles or the like members. According to the invention, however, the most simple procedure is to apply the solution to the cylinder by means of a rotor, which is substantially coaxial with the cylinder and disposed therebelow, said rotor upon operation throwing the solution upwardly onto the cylinder. Such a rotor can effect a uniform application throughout the length of the cylinder, and at the same time it is robust and not nearly so vulnerable as e.g. nozzles. The rotor can be so disposed as to immediately throw all the solution, which from the cylinder flows down into the container, back against the cylinder again, and as, consequently, there will normally be only a negligible quantity of liquid in the container itself, the duration of the presence of the solution in the container and on the cylinder can be made relatively short.

It is important to avoid that substantial variations occur in the relative volume of the solution which is vaporized, or in the case of concentration, in the degree of concentration of the concentrate, which is removed from the container under the cylinder. Only thereby it will be possible to produce a substantially uniform product and to produce a concentrate with a relatively high concentration of solid or viscous substances. In the latter case, even small fluctuations in the degree of concentration or the evaporation ratio will cause the concentration to become so high in some places that the solids in the solution burn on to the cylinder. This will destroy the concentrate and greatly reduce the heat conductivity of the cylinder wall, so that it has to be cleaned.

As mentioned above, by the method according to the invention the degree of concentration or the evaporation ratio can be made fairly insensitive to variations in the quantity of heat supplied to the cylinder by a suitable regulation of the rate at which the solutiton is supplied to the container under the cylinder. When evaporation is undertaken on a large, commercial scale, however, it is important that this regulation of the speed of supply can be effected automatically. According to the invention, this can be obtained by collecting at least part of the excess solution which drips from or is thrown off the cylinder, and passing said part to a control chamber, from where the solution thus collected is returned through an adjustable valve to the container. The thickness of the film of solution which adheres to the cylinder will be substantially independent of the quantity of solution which is sprayed onto the cylinder, and, as mentioned above, the rotor will throw substantially all the liquid present in the container under the cylinder against the latter. If the solution is discharged from the container under the cylinder at a constant rate, e.g. by means of a metering pump, the quantity of solution which drips from or is thrown off the cylinder during its rotation will therefore serve as a direct measure of the unevaporated quantity of liquid present in the container and on the cylinder. When, e.g. as a result of a reduced supply of heat to the cylinder surface, a drop in the rate of evaporation occurs, the quantity of liquid which drips from the cylinder will be increased, for which reason the level of liquid in the said control chamber at a predetermined setting of the valve will rise, whereas the level of liquid will fall at an increased rate of evaporation, provided that the solution is supplied to and discharged from the container under the cylinder at a constant rate. Thus it will be understood that the level of liquid in the control chamber will also be a measure of the quantity of liquid present in the container and on the cylinder. It is thus possible in a simple way to maintain the unevaporated quantity of liquid in the container and on the cylinder at a substantially constant value by automatically controlling the supply of solution to the container in dependence of variations in the level of liquid in the control chamber in such a way that the said liquid is maintained at a substantially constant level. As heretofore mentioned, the result is that changes in the ratio of evaporation caused by small variations in the supply of heat to the cylinder will be negligible.

It is a known technique to heat at least partially the heat-transferring surface by means of at least part of the vaporized portion of the solution, which, after having been compressed, is brought into heat-transmitting contact with the reverse or heated side of said surface. This heating medium may be supplemented with another gaseous medium, e.g. steam, in which case the compression can be effected by means of a steam-jet compressor.

In certain cases the vaporized portions of the solution reprsent a fairly high value, when the method is utilized on a large, commerical scale, and it will then be of considerable economic importance, if the individual constituents of the vaporized portions of the solution can be recovered in such a form as to be reused directly, so that the necessity of subjecting the heating medium to a special fractionating process is avoided.

According to the invention such a fractionating process is practicable by supplying the heating medium into the cylinder at the end remote from the location, where the solution is supplied to the liquid container, and by taking off condensate separately from different zones of the cylinder. The unevaporated portion of the solution and the heating medium, between which an exchange of heat takes place, will thus flow in opposite directions. When the heating medium reaches the first zone of the relatively cold inner surface of the cylinder, mainly the least volatile constituents of the heating medium will be condensed, so that the condensate discharged from this zone will contain a comparatively high percentage of this least volatile constituent. The condensate discharged from the next cylinder zone will contain a reduced quantity of the least volatile constituent, and so forth. It will be understood that the different constituents of the vaporized portions of the solution and water vapor, if any, can be partially separated from each other.

The invention furthermore relates to an apparatus to carry the said method into effect, and the apparatus according to the invention is characterized in that it comprises a cylinder, which is provided with longitudinal corrugations and is heatable from within, said cylinder being rotatable on a substantially horizontal axis and enclosed in a casing connected to vacuum producing means, and in that there is provided under the cylinder a rotor which is rotatably mounted in substantially coaxial relationhip to the cylinder, said rotor being disposed adjacent to the lowermost part of the casing, said casing having an inlet for solution and an outlet for the unevaporated part thereof, said inlet and outlet being spaced from one another in the longitudinal direction of the cylinder.

In operation of the apparatus the cylinder and the rotor rotate, and solution is supplied to the lowermost portion of the casing through the inlet. On account of the rotation of the rotor the solution will be sprayed on to the rotating cylinder, and a thin coat or film of the solution will adhere to the cylinder and rotate therewith, whereas excess solution will run back to the lowermost part of the casing. Thereby, part of the vaporizable constituents of the solution will evaporate from the cylinder, and the unevaporated residue will subsequently be washed off the cylinder and down into the lowermost part of the casing, when it re-enters the field of operation of the rotor. The apparatus is useful in cases where it is the unvaporized concentrate removed at the outlet, as well as where it is the vaporized part of the solution, which are the objects of interest. The cylinder has a comparatively large, active surface on account of the longitudinal corrugations, which also serve to ensure that the solution hits the cylinder surface at a relatively acute angle, so that the impact becomes a soft one. Furthermore, the cylinder can be manufactured at low cost, even in large dimensions, for which reason it is economically justifiable to employ a comparatively large heat-transmission surface. In the apparatus according to the invention it is thus possible to work with relatively small differences in temperatures and still obtain a desired capacity. Finally, the wall of the cylinder can be made relatively thin, and a high coefficient of heat transfer can therefore be obtained. Thus, the apparatus according to the invention is universally useful and can be produced and operated at low cost.

In order to obtain an effective spraying of the outer surface of the cylinder, it is desirable that the liquid which is thrown by the rotor against the cylinder surface hits same at a relatively high speed. The requisite speed of spraying, however, should preferably be obtained at a peripheral speed of the rotor as low as possible, as an unnecessarily high peripheral speed of the rotor is tantamount to increased power consumption. According to the invention each of the rotor buckets may consist of a channel-shaped member with a substantially U-shaped cross section, and may be disposed in longitudinal relationship to the rotor in such a way that the flanges of said member form an angle with the tangential plane of the rotor at the point in question, and of a longitudinal liquid-throwing blade, which is curved preferably in the direction of rotation and located between said flanges and spaced therefrom, and which projects beyond the free edges of the flanges. When the rotor is operated, the liquid in the lowermost portion of the casing will be caught by the liquid-throwing blade in each bucket, and under the influence of friction and centrifugal forces it will be led inwardly toward the bottom of the channel-shaped member. The direction of travel for the liquid will be reversed here, and the liquid will now be led outwardly on the other side of the liquid-throwing blade, the speed of the liquid being increased under the influence of the centrifugal forces. At the moment of leaving the rotor the fluid solution collected by the rotor buckets will thus have a substantial relative speed in addition to the peripheral speed of the rotor. Consequently, the absolute speed will be substantially increased by this special design of the buckets, so that at a predetermined speed of the rotor a particularly good spraying of the cylinder surface can be achieved.

Sometimes it is desirable to be able to discharge solutions with different compositions or degrees of concentration from the apparatus. This can be obtained with the present apparatus, as, according to the invention, the lowermost portion of the casing may have several spaced outlets for the unevaporated part of the liquid. The solution discharged from these outlets will then contain smaller quantities of the more volatile constituents, the farther the outlet concern is spaced from the inlet.

As mentioned in the foregoing, it is important that the unevaporated quantity of liquid present in the apparatus is maintained substantially constant, as in such case the evaporation ratio will not be changed materially by any fluctuations in the supply of heat to the cylinder. This is important because a substantially constant evaporation ratio will make it possible to work with small quantities of solution and comparatively high degrees of concentration for the concentrate without risk of the solids burning on to the cylinder. The desired controlling of the quantity of liquid in the apparatus can be obtained by forming according to the invention an internal pocket in the casing of the cylinder, said pocket being arranged to collect at least part of the excess solution, which drips or is thrown off the part of the cylinder adjacent the pocket, and by means of a duct this pocket may communicate with a control chamber, which is disposed between the level of the pocket and the level of the lowermost portion of the casing, and which again communicates with the lowermost portion of the casing through a duct, which is governed by an adjustable valve, and in the said control chamber there may be provided control means being responsive to the level of liquid in the control chamber and being adapted to automatically control the supply of solution to the inlet at the lowermost portion of the casing. Provided that the unevaporated part of the solution is discharged from the outlet for concentrate at a constant rate, it will be possible by adjusting the valve to obtain a desired constant quantity of unevaporated solution in the container, the maintaining of a substantially constant level of liquid in the control chamber at a predetermined setting of the valve causing, as heretofore explained, the quantity of liquid in the apparatus to be kept constant. By this means it is obtained, as mentioned in the foregoing, that also the evaporation ratio and consequently the degree of concentration for the concentrate are maintained substantially unchanged.

By setting the adjustable valve for the control chamber the quantity of liquid which will constantly be present in the apparatus can be regulated, as heretofore mentioned, and it will therefore be possible to regulate the intensity of the throwing of liquid against the heating surface by the rotor.

The apparatus according to the invention may include a compressor, which is adapted to compress at least some of the part of the solution which is evaporated on the heat-transmission surface. In this way the evaporation heat from the evaporated part of the solution can be utilized, as together with an additional heating medium, e.g. steam, it can be condensed on the heat-transmission surface. According to the invention the removal of the condensate from the evaporation surface can then be effected thereby that the discharge pipe of the compressor is led into the cylinder at the end remote from the inlet for solution at the lowermost portion of the container, and that within the cylinder a stationary, drum-shaped insert is mounted, in the uppermost half of which there are formed longitudinal condensate draining channels being open in an upwardly inclining direction. Thus, the compressed heating medium will be passed in between the inner surface of the cylinder and the outer surface of the insert, and here it will first come into heat transmitting contact with the cold, fluid solution on the cylinder. Some of the heating medium will be condensed by this contact. During the rotation of the cylinder the corrugations of the latter will carry the condensate upwardly, until they incline to such a degree that the condensate under the influence of gravity and the centrifugal force is poured down on the insert, where it will be collected in the condensate draining channels, and from there the condensate may then in any suitable manner be removed from the apparatus.

According to the invention the insert may be tapering towards the end of the cylinder admitting the discharge pipe of the compressor. By this means it is obtained that the cross section for the flow of the heating medium is gradually diminished in accordance with the reduction in the volume of the heating medium caused by the condensation of some of the mixture, so that over the whole length of the cylinder the speed of flow most favourable to the heat-transmission is achieved.

When the heating medium flows through the space between the cylinder and the insert, the least volatile constituents of the heating medium will predominantly be the first to be condensed, whereas the less volatile constituents are condensed subsequently. Thus, a natural fractionation of the mixture takes place. According to the invention the condensate draining channels may be divided into zones, each of which may be connected with a pipe for the removal of condensate. A subdivision of the condensate is thereby obtained, and in this way the more volatile liquids can be separated from the less volatile ones.

The invention will now be explained in more detail, reference being had to the drawing, wherein.

Figure 1:
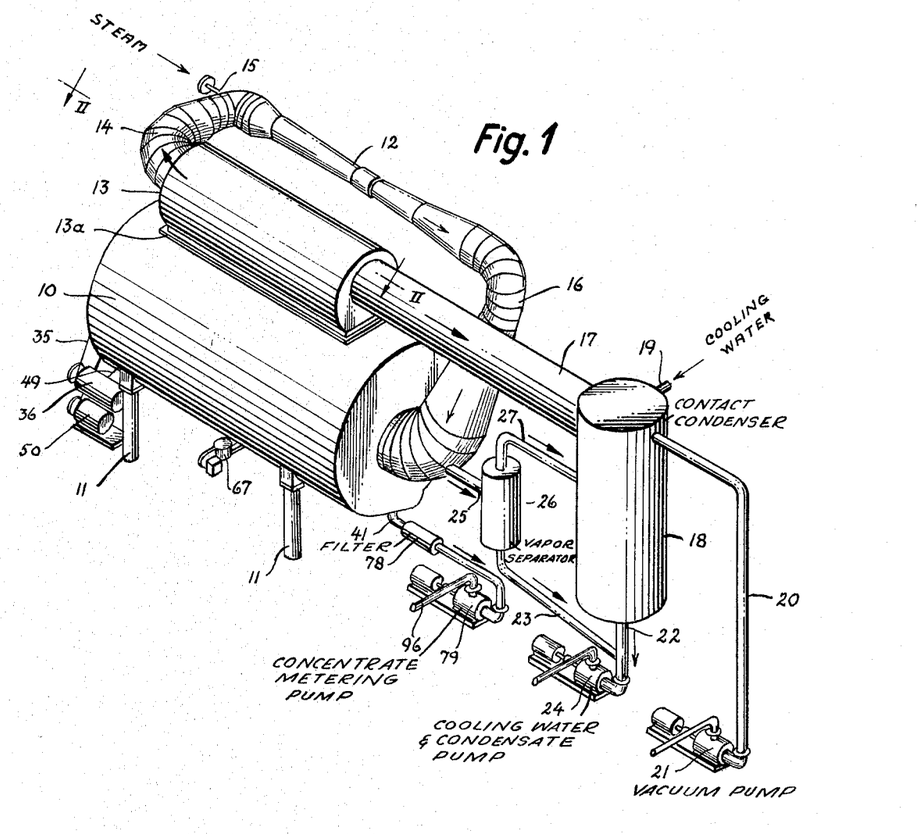
FIG. 1 is a schematic, perspective view of an evaporating system including an embodiment of the apparatus according to the invention.
Figure 2:
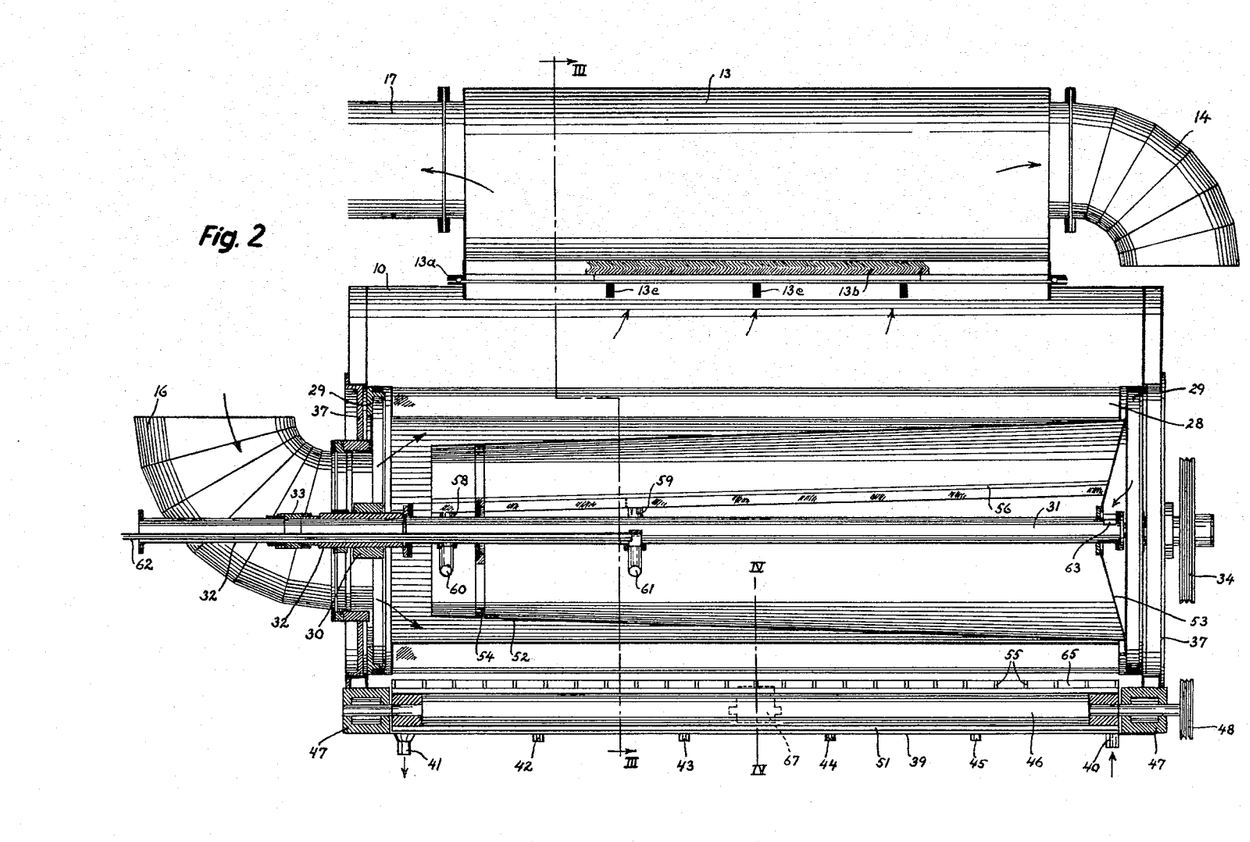
FIG. 2 is a side view of the reverse side of the apparatus shown in FIG. 1, partially in longitudinal section taken approximately on the line II—II in FIG. 1.

The evaporating system shown in FIG. 1 includes an evaporating apparatus with a casing 10, which is mounted on legs 11, and in the interior of which a vacuum can be produced by means of a steam-jet compressor 12. As will be explained hereinafter in more detail, an evaporation can be effected in the casing 10, a solvent being evaporated from a solution on a heat-transmission surface. On top of the casing 10 there is provided a steam-discharge chamber 13, which, as shown in FIG. 2, is tightly attached to the casing 10 by means of a flange connection 13a. By means of a pipe 14 and by a drop separator 13b being disposed above bracing ribs 13c for the casing 10, the steam-jet compressor 12 is in connection with the interior of the casing 10. High-pressure steam is supplied to the steam-jet compressor 12 through a steam inlet 15, and together with evaporated solvent drawn from the casing 10 the said high-pressure steam is passed through a pipe 16 back to the internal side of the heat-transmission surface, which is centrally located in the casing 10, where it is used to heat the heat-transmission surface. The end of the chamber 13 opposite the pipe 14 is connected to an injection contact condenser 18 by a discharge pipe 17, said condenser having an inlet 19 for cooling water. Furthermore, through a pipe 20 the condenser 18 is in connection with a vacuum pump 21, and through a cooling-water outlet pipe 22, into which a condensate outlet pipe 23 opens, it is in connection with a cooling-water and condensate pump 24. The vaporous heating medium supplied from the compressor 12 will be cooled and partly condensed, when inside the casing 10 it comes into contact with the said heat-transmission surface, and the steam-vapor mixture containing non-condensable gases and condensate will be passed through a pipe 25 to a container 26, where condensate and vapor are separated, the condensate being pumped out through the pipe 23, whereas air and vapor flow into the condenser 18 through a pipe 27.

Figure 3:
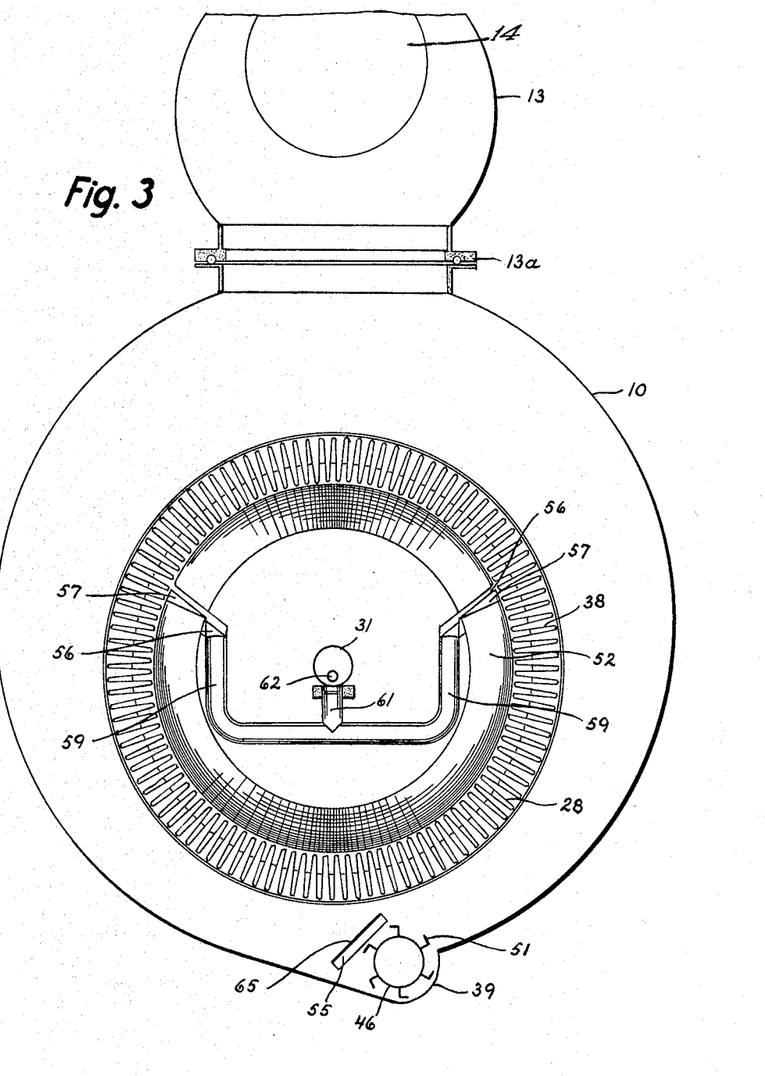
FIG. 3 is a section taken along the line III—III in FIG. 2, omitting certain parts for elucidation.

The heat-transmission surface disposed within the casing 10 consists, as shown in FIGS. 2 and 3, of a substantially cylindrical drum 28, which is rotatably mounted within the casing, at both ends being attached to end members 29, which as shown to the left in FIG. 2 have a boss 30 being rotatably mounted on a horizontal, stationary tube 31 extending through the cylinder 28 and the casing 10, the left end of said tube, FIG. 2, being made up of tube sections 32, which are inter-connected by means of a tube collar 33, and which are connected to the pipe 25. The cylinder 28, which is thus rotatable on a horizontal axis, can be driven by means of a pulley 34, which in a manner not shown is connected with the right-hand end member of the cylinder, and a belt 35 by an electric motor 36, FIG. 1. The casing 10 is provided with end covers 37, one of which fits tightly around the pipe 16 for the supply of heating medium, and the end covers are located so close to the cylinder end members 29 that an annular restriction is provided between the interior space of the cylinder 28 and the part of the interior of the casing 10, which surrounds the cylinder. The surface of the cylinder 28 is provided with deep, longitudinal corrugations 38, see FIGS. 3 and 4.

Figure 4:
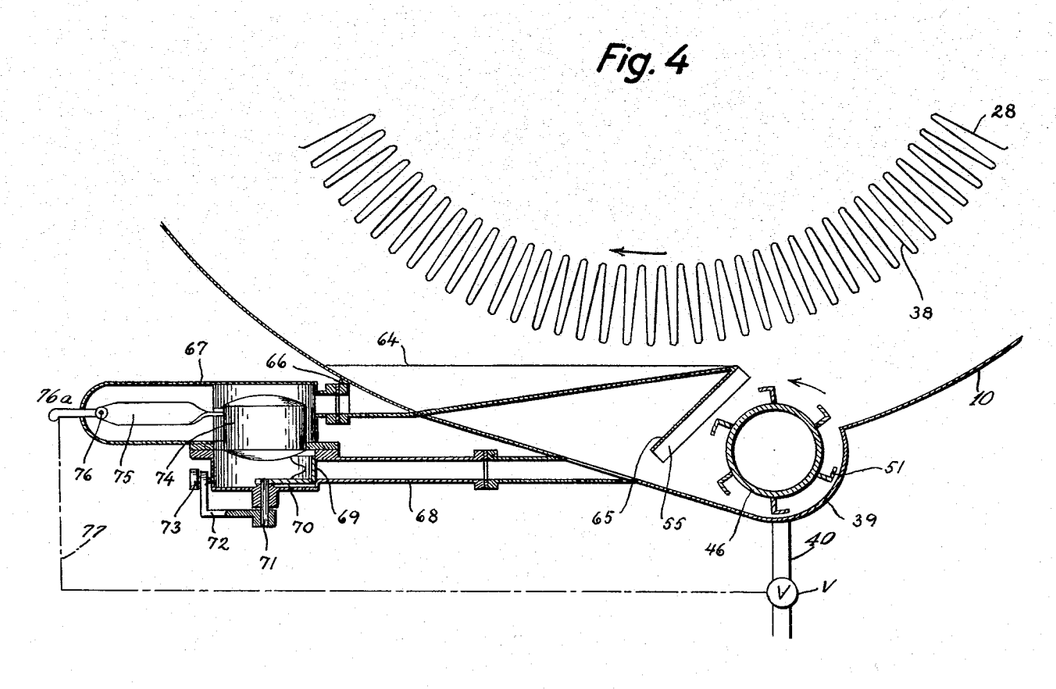
FIG. 4 shows on a larger scale a partial section along the line IV—IV in FIG. 2.

In the embodiment shown in FIGS. 3 and 4 the casing 10 is shaped at the bottom as a trough 39 with an inlet 40, FIG. 2, for a solution which is intended to be evaporated in the appararatus, and an outlet 41 for the concentrate produced. Between the inlet 40 and the outlet 41 a number of equally spaced intermediate outlets, 42, 43, 44, and 45, respectively, are disposed. Coaxially with the cylinder 28, but offset in relation to the vertical central plane thereof, there is disposed in the trough 39 a rotor 46, extending longitudinally through the whole of the cylinder, said rotor at its ends being rotatably mounted in bearings 47. One end of the rotor supports a pulley 48, by which means the rotor can be driven over a belt 49 by an electric motor 50, FIG. 1, and the rotor 46 is provided with longitudinal buckets 51. The rotor may also be in the form of a brush, if the solution is not too liable to form foam.

In the interior of the cylinder 28 there is disposed an insert 52, FIGS. 2 and 3, shaped as a truncated cone and formed of metal sheet, said insert being closed at one end by means of an end wall 53, which is attached to the stationary tube 31. At the opposite end the insert 52 is attached to the tube 31 by means of radial struts and a supporting ring 54.

In the uppermost half of the insert 52 there are formed two external and upwardly open condensate draining channels 56, see especially FIG. 3. At each outermost and lowermost edge of the channels 56 a wedge-shaped condensate shield 57, attached to the insert 52, is provided and substantially spans the interval between the insert 52 and the cylinder surface defined by the inwardly extending portions of the corrugations 38 of the cylinder 28. Each condensate draining channel 56 is in connection with at least one outlet pipe. In the embodiment shown in the drawing, two such outlet pipes, 58 and 59, respectively, are provided for each channel, one of said pipes being connected to the channel 56 adjacent to the narrow end of the insert 52, whereas the other pipe 59 is located at a distance from the said end of the insert 52, whereas the other pipe 59 is located at a distance from the said end of the insert. Similar outlet pipes for the two draining channels converge into common discharge nozzles, 60 and 61, respectively. By means of a flange connection the discharge nozzle 60 is connected with the stationary tube 31, and through the tube parts 32 and the pipe 25 it is in connection with the condensate pump 24. The discharge nozzle 61 is connected with a pipe 62, which in a suitable way may be in connection with a separate condensate pump, not shown. At the right-hand end of the tube 31 there is provided a slot 63, so that the space between the insert 52 and the cylinder 28 in this way communicates with the interior of the tube 31.

As shown in FIG. 4, there is provided below the central portion of the cylinder 28 and attached to the wall of the casing 10 an inwardly extending shield in the form of a trough or pocket 64, which extends through a short part only of the length of the casing 10. The uppermost edge of another shield 65 is attached to the free edge of the pocket 64, said shield 65 being arranged in an inclined position adjacent one side of the rotor 46 and having substantially the same length as the rotor. The shield 65 is provided with a plurality of transverse ribs 55, which serve to counteract splashing in axial direction. The pocket 64 is provided with a discharge nozzle 66, protruding from the casing 10, a control chamber 67 being mounted on said nozzle. Through a pipe 68 the said control chamber 67 is in connection with the trough 39, and the opening of the pipe 68 into the control chamber 67 can be fully or partially closed by means of a slide valve 69. Said slide valve 69 has a cylindrical outer surface corresponding to the cylindrical inner surface in the lowermost portion of the control chamber 67. The slide valve 69 is supported on an arm 70, which is attached to a shaft 71, said shaft being rotatably mounted and centrally disposed in the lowermost portion of the control chamber. An operating arm 72 is attached to the outermost end of the shaft 71, which can be locked in an adjusted position by means of a locking screw 73. Furthermore, a float 74 is provided within the control chamber 67, said float being attached to a float arm 75, which is mounted on a rotatable shaft 76. The float 74 senses the liquid level in control chamber 67 and any movement of the float is transmitted through arm 75 to rotate the shaft 76. Rotation of the shaft 76 may be used to control a supply of liquid to the apparatus as described below.

Operation of the apparatus causes the motors 36 and 50 to drive the cylinder 28 and the rotor 46, respectively, so that they rotate in the directions indicated in FIG. 4 by arrows. Furthermore, through the steam inlet 15 live steam is supplied to the steam-jet compressor 12, and in this way vapor will be drawn off through the pipe 14 from the steam-discharge chamber 13 and the casing 10, so that a vacuum is produced therein.

By means of the partial vacuum in the casing 10, a solution which it is desired to concentrate is drawn continuously through the inlet 40 into the trough 39. As the rotor 46 is rotating by means of its buckets 51, it will throw a powerful stream of solution on to the rotating cylinder 28. Solution being provided throughout the length of the trough 39, the cylinder 28 will be evenly sprayed substantially over the whole of its length. Part of the stream of fluid produced by the rotor will hit the shield 65 and immediately run back to the trough, and of the part of the stream of fluid hitting the cylinder surface an even coat will adhere thereto, whereas the excess quantity of fluid will drip off the cylinder. This dripping will take place substantially to the left of the vertical axial plane of the cylinder, FIGS. 3 and 4, for which reason part of the returning solution will be collected in the pocket 64 and part of it will hit the upper side of the shield 65. Thus, the solution dripping from the cylinder will not interfere with the stream of fluid directed by the rotor 46 on to a relatively narrow, axially extending part of the surface of the cylinder 28.

When the individual fluid particles are sprayed on to the surface of the cylinder 28, they will substantially follow a path, which lies in one of the transverse planes of the cylinder 28 and the rotor 46. The major part of the solution, which hits the surface of the cylinder 28, will strike against one of the side faces of the corrugations at a relatively acute angle, so that a comparatively soft impact is obtained and the liability of the solution to splashing at the moment of impact thereby reduced. Consequently, the fluid sprayed on to the cylinder will not move in the axial direction of the cylinder to any substantial extent. The speed of revolution of the rotor must be sufficiently high to ensure an even spraying of the cylinder, and the stream of solution from the rotor must be so powerful as to keep the cylinder surface free of coatings, as will be explained hereinafter. On the other hand, it is undesirable to rotate the rotor at a speed, which produces an unnecessarily high, relative speed between the solution spray and the cylinder surface.

The cylinder 28 rotates at a relatively low speed, as compared with the rotor 46, and at the same time it is heated internally, as will be explained in the following. At the rotation of the cylinder, the coat or film of solution which is sprayed on to the cylinder will be rotated therewith, and as the cylinder is heated, as mentioned in the foregoing, a lively evaporation will take place from the liquid film, a vacuum having been produced in the casing 10, as aforesaid. The speed of revolution of the cylinder 28 must be so high that there is not enough time to evaporate so much of the coat or film of solution on the cylinder surface that the solids in the solution stand in danger of burning on to the cylinder surface, before the cylinder portion concerned is down again in the zone, where the solution is applied. On the other hand, the speed of revolution of the cylinder must not be so high that the condensate on the inner side of the cylinder is prevented from dripping down on the insert 52 on account of the centrifugal force. The speeds of revolution of cylinder and rotor must be chosen in each individual instance with regard to the diameters of the cylinder and the rotor, the viscosity and liability to foaming of the solution, and the temperature of the cylinder surface.

On account of the evaporation taking place, the concentration of the coat of solution on the cylinder will be somewhat increased, the longer the portion of the cylinder surface concerned is removed from the spraying zone, but when the said portion of the cylinder surface returns down into this zone, the solution with the increased concentration will be washed away from the cylinder surface, and its place will be taken by solution having a lower concentration. The powerful spraying has the effect that the cylinder surface is easily kept free of deposits.

As mentioned in the foregoing, solution is continuously supplied to the trough 39 through the inlet 40, and simultaneously concentrate is continuously taken off at one of the outlets, e.g. the outlet 41, said outlet being connected through a filter 78 with a concentrate metering pump 79, FIG. 1, which at constant speed pumps the concentrate through a discharge pipe 96 to a place of collection. As, in the trough 39, the solution moves in the direction from the inlet 40 toward the outlet 41, and as the solution on its way is several times thrown on to the surface of the cylinder 28 and rotated therewith, the solution will become increasingly poor in liquid, and the concentration thereof will consequently be progressively increased, the farther it is removed from the inlet 40. Hence solution with different degrees of concentration can be discharged from one or more of outlets 41, 42, 43, 44 and 45 as desired.

The vaporous part of the solution which is evaporated on the cylinder 28 flows upwardly through the casing 10 and the drop separator 13b into the steam-discharge chamber 13. Part of the vaporized solvent flows through the discharge pipe 17 directly to the condenser 18, while the remainder is drawn through the pipe 14 into the steam-jet from the steam inlet 15. The mixture of steam and evaporated solvent is compressed in the steam-jet compressor 12 and through the pipe 16 admitted to the space between the cylinder 28 and the insert 52. Here, the first contact of the vapor-steam mixture is with the part of the cylinder next to the outlet 41, where the film of solution on the outer surface of the cylinder has its highest temperature. As, nevertheless, the inner side of the cylinder is colder than the compressed vapor mixture, the latter will give off so much heat to the cylinder 28 that the less volatile constituents of the mixture are condensed, and the heat of evaporation thereby released can be utilized to a further evaporation of solution on the outer surface of the cylinder. The condensate thus formed will be liable to collect in the lowermost part of the cylinder, but on account of the rotation of the latter the corrugations 38 of the cylinder will take the condensate upwardly, until the corrugations concerned incline to such a degree that gravitation overcomes the centrifugal force acting on the condensate, so that the latter runs out of the corrugations 38 and down on the insert 52, see FIG. 3. The condensate draining channels 56 are disposed at such a height on the insert 52 that the major part of the condensate that is poured out of the drains will hit the insert 52 at a place above the condensate shields 57. The condensate will then run down along the outer surface of the insert or the upper sides of the condensate shields 57 into the drains 56. On account of the inclination of the drains the condensate will flow from the drains out through the outlet pipe 58 and out of the apparatus through the tube 31 and the tube parts 32.

The remaining vapor-steam mixture flows on through the space between the insert 52 and the cylinder, the sectional area of which said space is gradually reduced corresponding to the reduction in quantity of the remaining steam-vapor mixture, so that over the whole length of the cylinder the most favourable speed of flow for the heat-transmission is obtained. The steam-vapor mixture now comes into contact with a progressively colder surface of the cylinder 28, for which reason also the more volatile constituents will now be condensed on the cylinder surface. In the same way as heretofore explained, the condensate thus produced will be taken up into the condensate draining channels 56 and run therein toward the outlet pipes 59, through which the more volatile condensate is passed into the pipe 62 and through the latter out of the apparatus. It will be understood that in the said manner the condensate can be divided into its more and less volatile constituents. It will be apparent that the channels 56 can be divided into still more sections with cooperating outlet pipes, and by this means an even more graduated subdivision of the condensate can be obtained. The part of the vapor-steam mixture which may escape condensation and the uncondensable air therein will pass through the slot 63 into the tube 31 and from there through the pipe 25, the container 26, and the pipe 27 into the condenser 18.

It should be noted that when it is desired to recover the solvent in the manner heretofore described it is the normal procedure to use the solvent as driving medium in the steam-jet compressor or to use a mechanical compressor, as will be described hereinafter.

The apparatus according to the invention makes it possible to regulate precisely the quantity of liquid present in the apparatus at any time.

The thickness of the film or coat of solution which is carried round with the cylinder 28 will be substantially independent of the quantity of solution which is sprayed by the rotor 46 on to the cylinder, and as the rotor will throw substantially all the solution present in the trough 39 upwardly, the quantity of liquid which drips off the cylinder 28 will be a good measure of the quantity of liquid present in the apparatus, and which is thus at disposal for spraying the heat-transmission surface of the cylinder 28.

When the apparatus is in operation, the pocket 64 under the cylinder 28 will collect part of the liquid, which drips from or is thrown off the cylinder 28. Through the discharge nozzle 66 this quantity of liquid will flow into the control chamber 67. The liquid can escape from the control chamber only through the pipe 68, the opening of which into the control chamber is partially covered by the slide valve 69. At a suitable adjustment of the slide valve 69 there can be obtained such a state of equilibrium that the liquid, which from the pocket 64 flows into the control chamber 67, flows back to the trough 39 through the pipe 68 just as rapidly, a level of liquid being maintained in the control chamber 67. If, at a certain adjustment of the slide valve 69, the supply of liquid from the pocket 64 is increased, for instance on account of a reduced supply of heat to the cylinder 28, the level of liquid in the control chamber 67 will rise, and this will cause the float 74 to be raised and the shaft 76 to be rotated. If, on the contrary, the supply of liquid from the pocket 64 is reduced, the float 74 will be lowered, and the shaft 76 will be rotated in the opposite direction. The movement of the shaft 76 is utilized to control a control mechanism for the supply of solution by way of the inlet 40 in such a way that a rise in the level of liquid in the control chamber causes a reduced supply of solution to the trough 39, whereas, conversely, a lowering in the level of liquid causes an increased supply of solution. For example as illustrated schematically in FIG. 4 an arm 76a on the shaft 76 is connected by control connections 77 to a regulating valve V controlling supply of liquid to the inlet 40 in such manner that as the float 74 rises, the valve V is moved toward closed positions. Thus, it can be obtained that the level of liquid in the control chamber 67 is automatically maintained substantially constant, which indicates that the unevaporated quantity of liquid in the apparatus is maintained substantially constant, so that the quantity of liquid at disposal for spraying the cylinder is constant all the time. Again, this causes the evaporation ratio and consequently the degree of concentration of the concentrate to be changed only immaterially, corresponding to a slight change in the quantity of heat supplied to the heat-transmission surface.

If, for example, the apparatus treats 1000 litres of solution per hour and evaporates 900 litres thereof at a supply of 500,000 kilogram calories to the heat-transmission surface, 100 litres being removed as concentrate, the ratio of evaporation will be 1:10. If the supply of heat is now increased by e.g. 6 percent, i.e. 30,000 kilogram calories, the quantity of solution evaporated will be increased by app. 50 litres to 950 litres. If the quantity of solution supplied were not changed, now only 50 litres of concentrate were taken off per hour, as is the case in the known apparatuses, the evaporation ratio would now be 50:1000 or 1:20. In the apparatus herein described, however, the control chamber and the associated control mechanism will ensure that on account of the increased evaporation of 50 litres, the supply of solution to the apparatus will be increased by 50 litres, so that the quantity of unevaporated solution in the apparatus is maintained constant, and the metering pump 79 will continue to remove the 100 litres per hour to which it is adjusted. In the case of the said increase of 6 percent in the supply of heat, the evaporation ratio in the apparatus according to the invention will consequently be changed only to 1:10.5. It will be understood that in this way the concentration of the concentrate produced will change only immaterially with minor fluctuations in the supply of heat to the heat-transmission surface.

The degree of concentration of the concentrate which is removed from the apparatus herein described can be changed by adjusting the concentrate metering pump 79, and the constant quantity of liquid which it is desired to maintain in the apparatus can be changed by adjustment of the slide valve 69, whereupon the latter can be locked in its new position by means of the locking screw 73.

Figure 5:
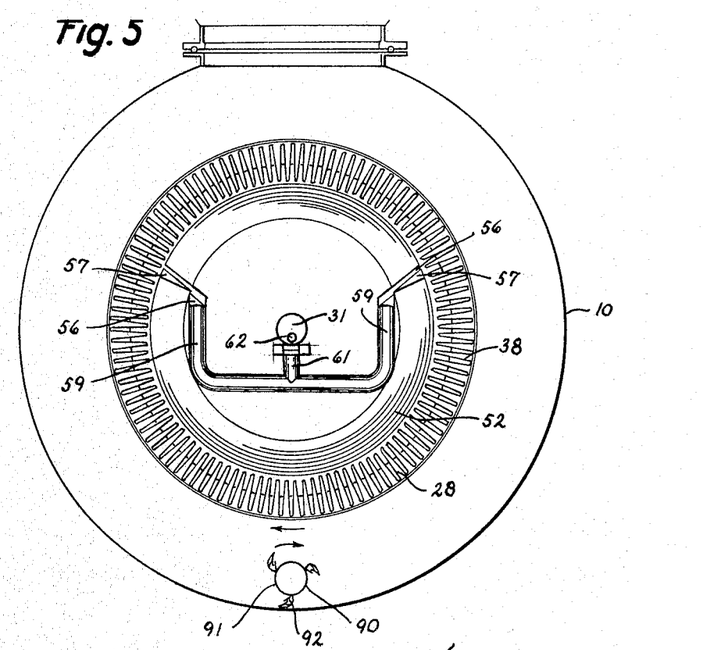
FIG. 5 shows part of a section corresponding to the one shown in FIG. 3, but taken through another embodiment of the apparatus according to the invention.
Figure 6:
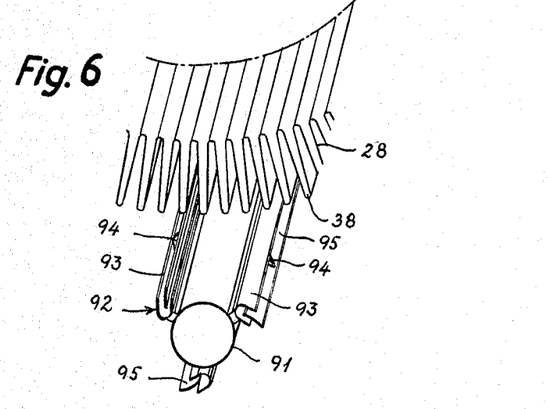
FIG. 6 is a perspective view of part of the cylinder and the rotor of the embodiment shown in FIG. 5.

A preferred embodiment of the apparatus according to the invention is shown in FIG. 5. The casing 10' has a substantially cylindrical shape and is not provided with a trough at its lowermost portion. At the bottom of the cylindrical casing there is provided a rotor 90, vertically below the cylinder 28 and coaxially therewith, said rotor consisting of a tubular member 91, which is provided with three buckets 92. As shown in FIG. 6, each bucket consists of a channel-shaped member 93, having a U-shaped cross section, and being so attached to the tubular member that its flanges form an angle with the tangential plane of the tubular member at the location concerned. Within the channel-shaped member 93 and between the flanges thereof, there is mounted an arcuate, liquid-throwing blade 95 by means of a plurality of struts 94, which are disposed in transverse planes relative to the rotor, said blade 95 projecting beyond the flanges of the channel-shaped member 93.

Experiments have proved that the rotor 90 provides a spraying of the cylinder 28 superior even to that of the rotor 46 heretofore described, and this good result can be obtained without specially designing the lowermost portion of the casing 10, as in the embodiment shown in FIG. 5.

The diameter and speed of revolution of the rotor 90 may for example be chosen so as to provide a peripheral speed of approximately 7.5 m./sec. As the solution flows along the bottom of the casing 10 towards the underside of the rotor at a speed of about 0.5 m./sec., the liquid will move in relation to the arcuate, liquid-throwing blade 95 at a relative speed of approximately 8 m./sec. On account of the influences of friction and centrifugal forces this speed will be somewhat reduced in the direction toward the rearmost edge of the blade. However, a substantial portion of the liquid caught by the liquid-throwing blade will reach the bottom of the channel-shaped member 93 at a substantial speed, and there the direction of travel of the liquid will be reversed, whereupon at increasing speed on the other side of the liquid-throwing blade the liquid will flow toward the outermost edge of the blade under the influence of the centrifugal forces, and there the relative speed will again approach 8 m./sec. The absolute speed, at which the liquid leaves the buckets 92 of the rotor 90, is defined by a vector addition of the said relative speed and the peripheral speed of the rotor, for which reason it will be substantially higher than at the rotor 46, where the absolute speed of the liquid will be substantially equal to the peripheral speed of the rotor. By means of the rotor 90 it is thus possible to obtain a very powerful spraying effect, a special design of the bottom portion of the casing 10 being unnecessary. The arrangement and operation of the apparatus shown in FIGS. 5 and 6 otherwise correspond exactly to the apparatus described in connection with FIGS. 2–4.

Figure 7:
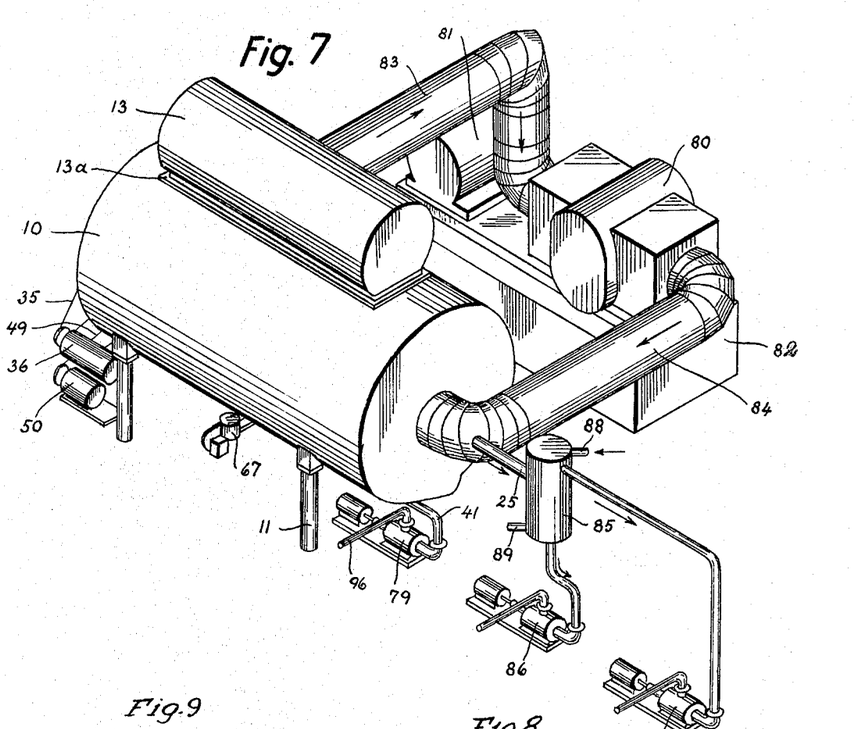
FIG. 7 is a schematic, perspective view of still another embodiment of an evaporating system including an embodiment of the apparatus according to the invention.

FIG. 7 shows another embodiment of evaporating system comprising the evaporating apparatus shown in FIGS. 2–4 or in FIGS. 5 and 6. The system mainly corresponds to the one shown in FIG. 1, and substantially identical components in the two figures are denoted by the same reference numerals. The system shown in FIG. 7 is chiefly distinguished from the one shown in FIG. 1 in that the steam-jet compressor 12 shown in FIG. 1 has been substituted by the mechanical compressor 80 shown in FIG. 7, said compressor being driven by an electric motor 81, and compressor as well as motor being mounted on a base 82. Through a pipe 83, which communicates with the steam-discharge chamber 13, the compressor 80 draws in all the solvent that is evaporated in the casing 10, and after having been compressed the vaporized solvent is passed through a pipe 84 into the space between the cylinder 28 and the insert 52, where the compressed vapors serve as a heating medium for the cylinder as heretofore explained. The condensate formed within the cylinder 28 is removed from the casing 10 as explained in the foregoing through the pipe 25. Said pipe 25 opens into a condensate cooler 85, which by means of pipes is in connection with a condensate pump 86 and a vacuum pump 87, respectively, which serve to remove uncondensed solvent and uncondensable gases. Finally, the condensate cooler is provided with inlet and outlet pipes for cooling water, 88 and 89, respectively.

The evaporating system shown in FIG. 7 works substantially as the one shown in FIG. 1, apart from the fact that live steam is not used in the system according to FIG. 7 for heating the cylinder 28, but only compressed heated solvent, and, in return, all the evaporated solvent is used for this purpose. This is particularly advantageous, when the solvent is a valuable one, which it is desirable to recover, because mixing the solvent with steam is avoided. If the solution which is evaporated contains several different solvents, condensate can be taken off at different zones of the insert 52, as mentioned in connection with the system shown in FIG. 1, and when a corresponding number of separate condensate pumps are used, fractionation of the solvents can thus be obtained.

In the following reference will be made to a few tests, which have been made with a system as the one shown in FIG. 1. By the tests use was made of a cylinder measuring 2.5 m. in length, with an external diameter of 1 m., and with corrugations having a height of 100 mm. and a mean width of 15 mm. The cylinder had a heat-transmission surface of 56 m.$^2$ and a speed of rotation of 20 r.p.m., while the rotor, which had an outer diameter of 100 mm. rotated at a speed of 900 r.p.m.

*Test No. 1*

In the said system evaporation was effected of insulin crude juice, which is a solution consisting of a small quantity of insulin dissolved in alcohol and water. During the experiment, which lasted for 2 hours and 35 minutes, a total of 1948 kg. of crude juice was supplied to the system, and at the concentrate outlet 41, FIG. 2, a total of 143 kg. of concentrate was removed. Consequently during the said period 1805 kg. of solvent were evaporated in the system, abt. 1020 kg. thereof being alcohol and the remainder water. During the experiment the pressure inside the casing 10 but outside the cylinder 28 was measured at 22 mm. Hg and inside the cylinder 40 mm. Hg.

Figure 8:
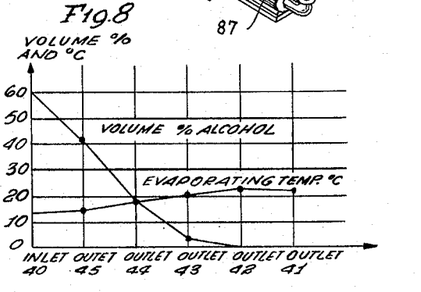
FIG. 8 shows graphically the variation of the alcohol concentration in the longitudinal direction of the apparatus when evaporating insulin crude juice in the system shown in FIG. 1.

During the experiment samples of concentrate were drawn at the outlets 41, 42, 43, and 45, and the concentration of alcohol in these samples was determined, as well as the temperature of the concentrate at the said outlets. FIG. 8 shows graphically the results obtained, the concentration of the alcohol remaining in the solution, as measured in percent by volume, and the temperature of the solution, respectively, being drawn as a function of the axial distance from the inlet 40 of the trough 39.

It could be assumed that such an axial movement in relation to the cylinder would be imparted to the solution, when it is sprayed on to the outer surface of the cylinder 28 by the rotor 46, that a certain retrograde mixing of the solution would take place. However, the results of the experiment shown in FIG. 8 demonstrate that the evaporation proceeds continuously without substantial intermixing. At the inlet 40 of the trough 39 the solution contains no less than 60 percent of alcohol, but already at the last outlet but one, 42, the solution is absolutely free of alcohol.

It will also be evident from FIG. 8 that the temperature of the solution rises from abt. 12° C. at the inlet to abt. 22° C. at the outlet 41. The heating medium which flows in counter-flow on the inner side of the cylinder had a temperature of abt. 18° C. at the end of the apparatus, where the solution is supplied, whereas the temperature of the heating medium at the other end of the cylinder, where the heating medium is supplied, was abt. 29° C. Consequently, in the present case the apparatus worked with a difference in temperatures over the heat-transmission surface of the cylinder 28 of abt. 6° C.

It should be emphasized that in practice the system shown in FIG. 7 would have been more advantageous for evaporation of insuline crude juice, as just described, because the loss of solvent would then have been a slight one, as mentioned in the foregoing, seeing that the condensate can be subdivided into suitable fractions, so that the major part thereof can be used again directly.

Test No. 2

In a system as the one shown in FIG. 1 and with the dimensions of cylinder and rotor mentioned in the foregoing, evaporation of an aqueous solution of trypsin was effected.

Through the inlet 40 a quantity of 800 kg. of solution was supplied to the trough 39 per hour, and from this qauntity 80 kg. of concentrate were removed per hour at the outlet 41, corresponding to an evaporation of 720 kg. of water per hour. Of the said 720 kg. of evaporated water 480 kg. were passed through the pipe 14 to the steam-jet compressor 12, whereas the remaining 240 kg. through the pipe 17 were passed directly to the condenser 18. Through the steam inlet 15, 240 kg. of live steam were supplied at 4 kg./cm.$^2$ gauge, a total of 720 kg. of steam being thus supplied per hour through the pipe 16 into the interior of the cylinder 28. The pressure within the casing 10 and without the cylinder 28 was abt. 35 mm. Hg whereas the pressure inside the cylinder was abt. 45 mm. Hg. The difference in temperatures over the heat-transmission surface of the cylinder was abt. 4° C. It should be noted that for every kilogramme of steam supplied through the steam inlet 15, not less than 3 kg. of water were evaporated from the solution.

Figure 9:
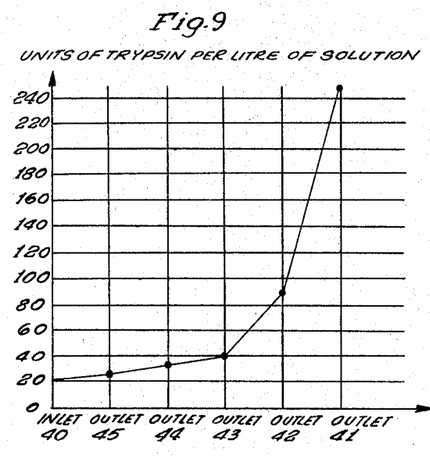
FIG. 9 shows graphically the variation of the trypsin concentration in the longitudinal direction of the apparatus when evaporating a trypsin solution in the system shown in FIG. 1.

During the experiment samples of concentrate were drawn at the outlets 41, 42, 43, 44, and 45, and for each of the said samples the number of trypsin units per litre of solution was determined. FIG. 9 shows graphically the results obtained by the test, the concentration of trypsin in the solution being drawn as a function of the distance from the inlet 40 for solution. It will be evident from FIG. 9 that the concentration increases evenly with increasing distance from the inlet 40.

In the foregoing the invention has been described by way of example in connection with an evaporating system where the concentrate produced is first and foremost of interest. However, it is also possible to use the apparatus according to the invention as a distilling apparatus, where the condensate is the main product, and finally the apparatus can be used to separate one or more intermixed liquids by fractionation, as the condensate draining channels 56 of the insert 52 can be subdivided into two or more sections, as heretofore explained.

What we claim is:

1. A process for evaporating a liquid from a solution comprising the steps of throwing a thin layer of said solution onto the lower portion of the exterior surface of a substantially cylindrical heat conducting drum from a container extending below said drum for a substantial part of the length thereof, the exterior surface of said drum being provided with a multiplicity of relatively deep axially extending corrugation, said solution being thrown onto the drum over a substantial part of the length thereof, concurrently rotating said drum about a substantially horizontal axis, subjecting the outer surface of said drum to vacuum and supplying heat to the interior of said drum to vaporize a portion of the solution supplied to the drum, collecting an unvaporized portion of said solution from said drum and returning it to said container, feeding fresh solution to and removing unevaporated solution from said container at points spaced apart in the longitudinal direction of the drum and repeatedly throwing said collected solution and said fresh solution onto said drum as the drum rotates, the liquid level in said container being lower than the surface of the drum onto which said solution is thrown.

2. A process according to claim 1, in which the feeding of said fresh solution is controlled in response to the amount of unevaporated solution collected from said drum.

3. A process according to claim 1, further comprising compressing at least a part of the vapor produced by evaporating liquid from the exterior of said drum and passing said compressed vapor through the interior of said drum.

4. A process for evaporating a liquid from a solution comprising the steps of throwing a thin layer of said solution onto the lower portion of the exterior surface of a substantially cylindrical heat conducting drum from a container extending below said drum for a substantial part of the length thereof, said solution being thrown onto the drum over a substantial part of the length thereof, concurrently rotating said drum about a substantially horizontal axis, subjecting the outer surface of said drum to vacuum and supplying heat to the interior of said drum to vaporize a portion of the solution supplied to the drum, collecting an unvaporized portion of said solution from said drum and returning it to said container, feeding fresh solution to said container at a selected location and repeatedly throwing said collected solution and said fresh solution onto said drum as the drum rotates, the liquid level in said container being lower than the surface of the drum onto which said solution is thrown, and removing unevaporated solution from said container at a plurality of locations spaced longitudinally of said drum from one another and from said location of feeding fresh solution, to provide fractions having difference concentration of vaporizable liquid.

5. Apparatus for evaporating liquid from a solution comprising a substantially cylindrical heat transferring drum having a substantially cylindrical surface with relatively deep corrugations extending longitudinally of the drum, said drum being rotatable on a horizontal axis, means for heating said drum, a casing enclosing said drum, means for producing vacuum in said casing, a trough disposed under said drum and extending longitudinally of the drum for a substantial portion of the length of the drum, means for feeding solution to said trough, an elongated rotor rotating in said trough and having buckets for throwing solution from said trough onto the lower portion of said drum to form a layer of solution on said drum as the drum rotates, a portion of said solution being vaporized by said vacuum and heating, means for collecting an unevaporated portion of said solution from said drum and returning it to said trough whereby said solution is again thrown onto said drum by said rotor and means for discharging concentrated solution from said trough at a point spaced longitudinally of said drum from said feeding means.

6. Apparatus according to claim 5 further comprising means for sensing the amount of unevaporated solution collected from said drum and controlling said feeding means in accordance with said amount to maintain uniform operation.

7. Apparatus according to claim 5, in which said trough is defined by the lower portion of said casing 8. Apparatus according to claim 5, in which said trough is provided with a plurality of discharge outlets spaced from one another longitudinally of said drum.

9. Apparatus according to claim 5, in which said corrugations have a depth greater than their crest-to-crest spacing.

10. Apparatus according to claim 5, in which said rotor comprises a supporting member extending longitudinally of said drum and a plurality of rotor buckets each comprising a channel-shaped member with a substantially U-shaped cross section, the channel-shaped member being disposed longitudinally of the rotor and each comprising spaced flange portions projecting angularly outwardly and forwardly from said supporting member and a longitudinal liquid-throwing blade spaced between and projecting forwardly in the direction of rotation of said rotor from the said flange portions.

11. Apparatus according to claim 5, further comprising means for compressing at least a portion of the vapor resulting from said partial evaporation of said solution and feeding the compressed vapor to the interior of said drum.

12. Apparatus according to claim 11, in which said feeding means is adjacent one end of said drum and in which said compressed vapor is discharged into the interior of said drum at the opposite end of the drum.

13. Apparatus according to claim 12, further comprising a drum-shaped insert arranged within said drum, the walls of said insert in the uppermost half of the insert defining draining channels being open in an upwardly inclined direction for discharging evaporated solution after it having been compressed by said compressor and condensed in the inner space of said container.

14. Apparatus as defined in claim 13, in which said insert tapers towards the end of the drum at which the discharge of said compressor is connected.

15. Apparatus as defined in claim 14 in which the condensate draining channels are divided into longitudinal sections, each of which being connected to a condensate discharge means.

16. In evaporating apparatus having a substantially cylindrical evaporating drum, a casing surrounding said drum and a rotor in a lower portion of said casing for throwing a liquid to be evaporated onto said drum, said rotor comprising a supporting member extending longitudinally of said drum and a plurality of rotor buckets each comprising a channel-shaped member with a substantially U-shaped cross section, the channel-shaped member being disposed longitudinally of the rotor and each comprising spaced flange portions projecting angularly outwardly and forwardly from said supporting member and a longitudinal liquid-throwing blade spaced between and projecting forwardly in the direction of rotation of said rotor from said flange portions.

References Cited by the Examiner

UNITED STATES PATENTS

| | | | |
|---|---|---|---|
| 1,017,776 | 2/1912 | Levy | 118—326 X |
| 1,501,515 | 7/1924 | Testrup | 159—12 |
| 1,530,439 | 3/1925 | Testrup et al. | |
| 1,667,291 | 4/1928 | Lavett | 299—63 |
| 2,446,997 | 8/1948 | Brewer et al. | 202—205 X |
| 2,614,973 | 10/1952 | Burrows | 205—205 |
| 2,707,836 | 5/1955 | Garrett | 34—124 |
| 2,782,843 | 2/1957 | Rodenacker | 159—11 |

FOREIGN PATENTS

| | | |
|---|---|---|
| 497,034 | 5/1930 | Germany. |

NORMAN YUDKOFF, *Primary Examiner.*

J. SOFER, *Assistant Examiner.*